(No Model.)

L. L. WHITE.
DENTAL IMPRESSION MATERIAL.

No. 603,803. Patented May 10, 1898.

Witnesses,

Inventor,
Louis L. White
By Dewey & Co.
Att'ys

UNITED STATES PATENT OFFICE.

LOUIS L. WHITE, OF SAN FRANCISCO, CALIFORNIA.

DENTAL IMPRESSION MATERIAL.

SPECIFICATION forming part of Letters Patent No. 603,803, dated May 10, 1898.

Application filed December 27, 1897. Serial No. 663,556. (No specimens.)

*To all whom it may concern:*

Be it known that I, LOUIS L. WHITE, a citizen of the United States, residing in the city and county of San Francisco, State of California, have invented an Improvement in Dental Impression Material; and I hereby declare the following to be a full, clear, and exact description of the same.

My invention relates to an improvement in the formation of dental matrices.

It consists, essentially, in the employment of a suitable plastic material with an interposed thin sheet of malleable, fibrous, or other tough substance which serves to hold the parts of the matrix together and to prevent a breaking through of the surface between the opposed matrices.

It also consists in details of construction which will be more fully explained by reference to the accompanying drawings, in which—

Figure 1:
Figure 2:
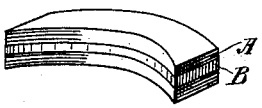
Figure 3:
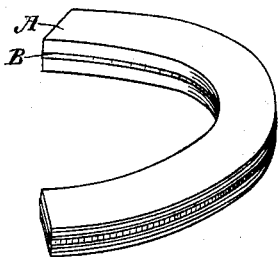
Figure 4:
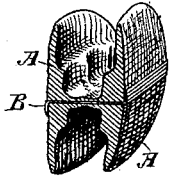

Figures 1, 2, and 3 are views of matrix-forming blocks of different shapes. Fig. 4 shows a view of a double matrix formed by my method.

In the preparation for crown or bridge work it is necessary to have an accurate mold of the cusps or the surfaces of the teeth and other adjacent parts, and for this purpose it is customary to employ a plastic wax, cement, or compound which can be placed between the teeth, and by closing the teeth thereon they will be sunk into this plastic material, forming an accurate facsimile of the surfaces, cusps, depressions, and all irregularities of the outline of the two sets of teeth. After this has been done the matrix, being removed, can be filled with plaster-of-paris, and after this has set the wax can be melted or otherwise removed, leaving an exact facsimile of the teeth or surfaces desired. The difficulty with this method is that when the teeth are in place and closed together the plastic material is so crushed out between the occluding teeth that it is practically broken away, and the outer an inner sides of the matrix are not properly held together. They therefore become displaced with relation to each other upon removal from the mouth, and it is not possible to again replace them in their proper position, so as to make a proper plaster mold of the two opposing sets.

In my invention I employ a suitable plastic wax or other compound formed into blocks of any suitable size or shape and adapted to be fitted into the mouth by closing the teeth upon opposite sides, so that a matrix of the teeth in the opposing jaws can be formed upon the opposite sides of the material used.

In forming the blocks of material I introduce in each block a thin sheet of malleable or fibrous material having such strength and toughness as will prevent its being crushed, torn, or broken when the teeth are closed upon opposite sides to form a matrix, and I prefer to extend it a little beyond the sides of the block and turn the edges up, so that when placed in the mouth these edges will not cut the tongue.

The operation will then be as follows: The space in the jaws for which the facsimile is required having been determined, a prepared block of the plastic material A, with the interposed substance B, is placed between the teeth or jaws and the latter closed until they are brought closely together. This forms an exact matrix of the opposing teeth; but by reason of the interposed tough material no break can be made through at the points where the teeth are brought together, and the opposite sides, which are shaped up to fit the gums, are prevented from being separated by reason of the breaking of the material or its thinness at the point between the teeth. The matrix thus formed is afterward removed, and it is only necessary to fill the two parts with plaster-of-paris, allowing the latter to set, and the molds formed in the matrices can be so connected with an articulator as to retain their relative position to each other, and the wax or material used for the matrices can be melted or otherwise removed, leaving a perfect facsimile of the teeth, closing together exactly as they do in their natural state. From the facsimiles thus produced the teeth can be made and fitted in any usual or well-known manner.

Having thus described my invention, what I claim as new, and desire to secure by Letters Patent, is—

1. A dental impression material of a plastic character, adapted to be crushed between the jaws and to form a matrix of the occluding surfaces, said material having an interior sheet of tough fibrous material adapted to prevent a rupture of the interposed plastic material when the teeth are closed upon opposite sides to form a matrix.

2. A dental forming-matrix consisting of a plastic material formed in blocks having a thin sheet of tough malleable or fibrous material interposed between the top and bottom of the block, with the exterior edges turned up against the side thereof.

In witness whereof I have hereunto set my hand.

LOUIS L. WHITE.

Witnesses:
S. H. NOURSE,
JESSIE C. BRODIE.